United States Patent
Quentin (10) Patent No.: US 11,880,840 B2
(45) Date of Patent: Jan. 23, 2024

(54) METHOD FOR CARRYING OUT A TRANSACTION, CORRESPONDING TERMINAL, SERVER AND COMPUTER PROGRAM

(71) Applicant: BANKS AND ACQUIRERS INTERNATIONAL HOLDING, Paris (FR)

(72) Inventor: Pierre Quentin, Enghien les Bains (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 16 days.

(21) Appl. No.: 16/456,524

(22) Filed: Jun. 28, 2019

(65) Prior Publication Data

US 2020/0005306 A1 Jan. 2, 2020

(30) Foreign Application Priority Data

Jun. 29, 2018 (FR) ...................................... 1856009

(51) Int. Cl.
*G06Q 20/40* (2012.01)
*G06Q 20/32* (2012.01)

(52) U.S. Cl.
CPC ..... *G06Q 20/4014* (2013.01); *G06Q 20/3227* (2013.01); *G06Q 20/3278* (2013.01); *G06Q 20/4018* (2013.01)

(58) Field of Classification Search
CPC .................... G06Q 20/00–425; H04L 9/00–50
See application file for complete search history.

(56) References Cited

U.S. PATENT DOCUMENTS

| 7,103,575 B1 * | 9/2006 | Linehan ............. G06Q 30/0601 705/26.1 |
| 10,692,085 B2 * | 6/2020 | Zagarese .......... G06Q 20/40145 |

(Continued)

FOREIGN PATENT DOCUMENTS

| CN | 101114397 A * | 1/2008 |
| DE | 102011119820 A1 | 8/2012 |

(Continued)

OTHER PUBLICATIONS

Certificate—Glossary _ CSRC (Year: 2023).*

(Continued)

*Primary Examiner* — Ari Shahabi
(74) *Attorney, Agent, or Firm* — David D. Brush; Westman, Champlin & Koehler, P.A.

(57) ABSTRACT

A method for processing a transaction of a communications terminal, requesting a server, through a communications network, for implementing a transaction involving the use of payment data. The method is implemented by the communications terminal and includes: obtaining a user identification certificate, the user identification certificate being formed out of an identity document in the possession of a user making the transaction; inserting the user identification certificate into a transaction data structure; transmitting the transaction data structure to the server; and, when the user identification certificate received by the server is valid, receiving a piece of data representing the validation of the transaction by the server.

6 Claims, 3 Drawing Sheets

(56) References Cited

U.S. PATENT DOCUMENTS

| | | | | |
|---|---|---|---|---|
| 10,943,233 | B2* | 3/2021 | Eckel | G06Q 20/3226 |
| 10,949,852 | B1* | 3/2021 | Kramme | G06Q 20/3224 |
| 2003/0028481 | A1* | 2/2003 | Flitcroft | G07F 7/12 705/39 |
| 2008/0313088 | A1* | 12/2008 | Cahn | G06Q 20/3674 705/50 |
| 2009/0283586 | A1* | 11/2009 | Cecere | G06Q 20/4014 235/380 |
| 2014/0074710 | A1* | 3/2014 | Muthu | G06Q 20/40 705/44 |
| 2014/0076967 | A1* | 3/2014 | Pushkin | G06F 21/35 235/380 |
| 2014/0258136 | A1* | 9/2014 | Ellis | G06Q 20/4016 705/76 |
| 2014/0270336 | A1* | 9/2014 | Eckel | G06Q 20/4014 382/100 |
| 2014/0279519 | A1* | 9/2014 | Mattes | G06Q 20/12 705/44 |
| 2015/0058931 | A1* | 2/2015 | Miu | G06Q 20/4016 726/3 |
| 2015/0269698 | A1* | 9/2015 | Follis | G06Q 50/265 705/325 |
| 2015/0278792 | A1* | 10/2015 | Naccache | G06Q 20/40 705/18 |
| 2015/0332361 | A1* | 11/2015 | Meister | G06Q 10/02 705/26.35 |
| 2016/0155123 | A1 | 6/2016 | Song | |
| 2017/0116596 | A1* | 4/2017 | Tsui | G06Q 20/3278 |
| 2017/0116609 | A1 | 4/2017 | Geraud et al. | |
| 2018/0181964 | A1* | 6/2018 | Zagarese | G06Q 20/40145 |
| 2018/0268411 | A1* | 9/2018 | Voldman | G06Q 20/4018 |
| 2020/0082384 | A1* | 3/2020 | Guise | G06Q 20/356 |

FOREIGN PATENT DOCUMENTS

| | | | | |
|---|---|---|---|---|
| EP | 3163487 A1 | | 5/2017 | |
| GB | 2541013 A | * | 2/2017 | G06F 21/34 |
| GB | 2541013 A | | 2/2017 | |
| WO | 2012053780 A1 | | 4/2012 | |

OTHER PUBLICATIONS

Forgery Definition & Meaning—Merriam-Webster (Year: 2023).*

Reply_to_Communication_from_the_Examining_Division.fr.en (english) (Year: 2023).*

Reply_to_Communication_from_the_Examining_Division (french) (Year: 2023).*

French Search Report and Written Opinion dated Nov. 23, 2018 for corresponding French Application No. 1856009, filed Jun. 29, 2018.

English translation of Written Opinion of the French Searching Authority dated Nov. 23, 2018 for corresponding French Application No. 1856009, filed Jun. 29, 2018.

English machine translation of the Notification under Article 94(3) dated Mar. 23, 2021 for corresponding parallel European Application No. 19181850.9.

* cited by examiner

METHOD FOR CARRYING OUT A TRANSACTION, CORRESPONDING TERMINAL, SERVER AND COMPUTER PROGRAM

1. FIELD OF THE DISCLOSURE

The disclosure relates to the securing of payments. More particularly, the disclosure relates to the securing of payments made by using a portable communications terminal such as a smartphone, a tablet or again a connected watch. Here below, this type of payment is called a mobile payment. More specifically again, it is an object of the present technique to increase the level of security of a data transmission in the context of a mobile payment made with a portable communications terminal (for example a smartphone or a tablet) and an identity document of the user who possesses the mobile communications terminal and is the holder of the payment data used to make the payment transaction.

2. PRIOR ART

Generally, online payments, including mobile payments, represent, on the one hand, a particular type and, on the other hand, an increasing proportion of the payments made each year in the world. They can made using payment providers such as PayPal™ or through conventional bank organizations, using a bank payment card.

However, online payment is marked by a relatively high rate of fraud. In France, it is estimated that about 5% of Internet online payments are fraudulent. This five-percent fraudulent payment figure amounts to about 33% of the total cost of fraud. Means are therefore needed firstly to identify attempts at fraud and secondly to block these attempts.

One of the problems with transactions using mobile devices is that they are made in "card not present" (or CNP) mode. In this mode, since no device (such as for example a payment terminal), is in charge of verifying the integrity of the card, it cannot be verified that the holder of the card possesses the PIN code needed to confirm a transaction: the payment card is not used to carry out the transaction. Only the data recorded on the card are used to carry out the transaction. These data can be stolen for transactions by fraudulent individuals, possibly in using other merchant applications in the context of other mobile payments. Accessorily, the user's communications terminal (which includes all the data of the payment card used by the user) can also be stolen, giving the thief access to all of the user's data and enabling the thief to carry out fraudulent transactions.

Thus, in order to secure transactions made in CNP mode, systems and methods have been proposed to resolve these problems of fraud. These methods raise problems of convenience for the user or other security problems. This is for example the method described in the patent document WO2012053780. In this document, a system and a method of verification are described. More particularly, a method and a system using information on the MAC address of a customer terminal are described. During a transaction involving a payment, a process of authentication is implemented in which the MAC address of the terminal used by the user wishing to carry out a payment is compared with a reference MAC address defined or obtained by the bank server that must authorize a payment or a transaction.

This method, although potentially worthwhile, is nevertheless impractical. Indeed, on the one hand, this method obliges the user to always use the same apparatus to make a payment (unless several devices authorized to carry out a transaction are defined). On the other hand, there are numerous methods to falsify a MAC address of a peripheral. More particularly, the method described in WO2012053780 is based on obtaining a MAC address from a web browser. However, a hacker wishing to obtain a user's MAC address will have no difficulty in obtaining this address when he enters the credit card data of the user in question, for example by using a method in which one places oneself before the merchant's server (or the editor of the application used for the payment). Thus, the method described in WO2012053780 does not seem to be very useful since the complementary information (the MAC address of the transactional device) would be as vulnerable as the others. The method described therefore has little likelihood of really securing the transaction.

Other methods are also available. Certain methods imply providing the user with unique or one-time bankcard numbers. These numbers are provided according to the customer's needs. This method is interesting but does not eliminate the possibility for the user of using his own card information to make transactions. In other methods, widely used at present, an SMS type message is transmitted to the customer carrying out a transaction to make sure that he is the bearer of the card. At the time of the transaction, the bearer must therefore enter a password transmitted in the SMS. The bank thus makes sure, with reasonable probability, that the person carrying out the transaction is the user. This method has two drawbacks: on the one hand, it requires the user to provide his telephone number to the bank before any transaction and to do so in a secure way. On the other hand, and above all, this method works only if the customer's bank is also the bank managing the transaction on behalf of the merchant. This is not necessarily be the case, especially abroad which is precisely where the greatest proportion of fraud is perpetrated. Thus, the above-mentioned method is not very efficient in this case.

3. SUMMARY

An exemplary embodiment of the method proposed by the inventors does not raise these problems of the prior art. Indeed, a transaction-securing method is proposed, based on the identity of the user making the mobile payment.

More particularly, an aspect of the disclosure relates to a method for carrying out a transaction of a communications terminal requesting a server, through a communications network, for acceptance of a transaction involving the use of payment data (in CNP mode), said payment data coming from a payment means. According to an aspect of the disclosure, this transaction is secured by the use of an identity document of the user.

More particularly, an aspect of the disclosure relates to a method for processing a transaction of a communications terminal requesting a server, through a communications network, for the implementation of a transaction involving the use of payment data, a method implemented within the communications terminal, a method characterized in that it comprises:
 a step for obtaining a user identification certificate, said user identification certificate being formed out of an identity document in the possession of a user making this transaction;
 a step for inserting said user identification certificate into a transaction data structure;
 a step for transmitting the transaction data structure to said server;

and when the user identification certificate received by said server is valid, a step for receiving a piece of data representing the validation of the transaction by said server.

Thus, it is possible to secure a transaction that is made in card-not-present mode through a user authentication and therefore to ensure a certain validity of the data implemented in the transaction.

According to one particular characteristic, the step for obtaining a user identification certificate comprises:
  a step for sending a request, to a digital identity card of the user, for obtaining a user identification certificate;
  a step for receiving, from said digital identity card, said user identification certificate.

Thus, a complementary electronic means is used to implement the digital identification certificate providing the basis of a distributed identification architecture, of which at least one element (the user's digital identity card) is secure.

According to one particular embodiment, the method furthermore comprises:
  a preliminary step for determining a certification parameter value, said certification parameter being related to said transaction; and
  a step for inserting the certification parameter value into the request for obtaining a user identification certificate.

According to one particular characteristic, the certification parameter belongs to the group comprising:
  a creation function parameter for creating said user identification certificate;
  a value representing a merchant's identifier;
  a value representing a communications terminal identifier;
  a value representing the transaction;
  a value representing a date and/or a time of the transaction.

According to one particular embodiment, said step for inserting said user identification certificate into a transaction data structure comprises a step of selection, from among a plurality of available fields, of a specific existing field.

According to one particular characteristic, the specific field is the field dedicated to the reception of the card verification value (CVV).

According to one particular embodiment, the certification parameter comprises a piece of data representing an identifier of said communications terminal and a piece of data representing a time of the transaction.

According to one particular characteristic, the user identification certificate represents an encryption operation carried out by said identity document, said encryption operation being carried out by means of a communication of an NFC type between said communications terminal of the user and said identity document.

According to another aspect, the disclosure also relates to a server for processing a transaction, taking the form of an electronic device connected to a communications network. According to an aspect of the disclosure, such a server comprises means of reception from a communications terminal. Such a server also comprises:
  means for receiving a transactional request, comprising at least one piece of data representing a payment to be made through said communications terminal and a user identification certificate;
  means for obtaining a piece of user identification certificate verification data from the identity document used for the transaction;
  means for determining a current user identification certificate associated with the data received within the transactional request;
  means for comparing the user identification certificates with one another;
  means for providing a third-party entity with a transactional authorization when said comparison is positive.

According to another aspect, the disclosure also relates to a communications terminal comprising means for processing transactions and means of requesting the server through a communications network, theses means being implemented either in the form of one or several dedicated microprocessors and memory or in the form of a secured couple formed by a secured processor and secured memory; these means being used to execute a transaction involving the use of payment data. Such a communications terminal comprises:
  means for obtaining a user identification certificate, said user identification certificate being formed out of an identity document in the possession of a user making said transaction;
  means for inserting said user identification certificate into a transaction data structure;
  means for transmitting the transaction data structure to said server;
  and means for receiving a piece of data representing the validation of the transaction by said server.

According to an exemplary implementation, the different steps of the method according to an aspect of the disclosure are carried out by one or more software programs or computer programs, comprising software instructions that are to be executed by a data processor according to a relay module according to an aspect of the disclosure and are designed to control the execution of the different steps of the methods.

An aspect of the disclosure is therefore aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

An aspect of the disclosure is also aimed at providing an information carrier or medium readable by a data processor and comprising instructions of a program as mentioned here above.

The information medium can be any entity or device whatsoever capable of storing the program. For example, the medium can comprise a storage means such as a ROM, for example, a CD ROM or microelectronic circuit ROM or again a magnetic recording means, for example a mobile carrier (memory card) or a hard disk drive.

Besides, the information medium can be a transmissible medium such as an electrical or optical signal, that can be conveyed by an electrical or optical cable, by radio or by other means. The program according to an aspect of the disclosure can be especially downloaded from an Internet type network.

As an alternative, the information medium can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware unit capable of implementing a function or a set of functions according to what is described here below for the module concerned. It can be a programmable hardware component or a component with an integrated processor for the execution of software, for example, an integrated circuit, a smart card, a memory card, an electronic board for the execution of firmware etc.

Each component of the system described here above can of course implement its own software modules.

The different embodiments mentioned here above can be combined with one another to implement one or more aspects of the disclosure.

4. FIGURES

Other features and advantages shall appear more clearly from the following description of a preferred embodiment, given by way of a simple illustratory and non-exhaustive example and from the appended drawings, of which.

5. DESCRIPTION OF THE DOCUMENT

5.1. Reminder of the Principle of an Exemplary Aspect of the Disclosure

As explained preliminarily, it has been noted that, with current solutions, it is not necessarily possible to be sure that the mobile payment made originates from the bearer of the payment means (the bearer of a payment card for example) whose data are used. The object of the proposed method is to see to it that, during the use of data of the payment means in CNP mode (i.e. by entering the payment data into an entry form or by using the payment data in text form to create a transaction), in the context of a mobile payment, it is possible all the same to obtain a certification of the user's identity. In short, the goal is to secure the CNP mode (the textual use of the payment data) in adding thereto the user's identification data (user identification certificate), data that can be verified without fundamentally changing the user's habits and with full discretion.

To this end, the steps leading to the validation of the transaction are modified. In at least one embodiment of the proposed method, in addition to (or instead of) the data of the payment card (name, number, date, card verification value—CVV), a piece of data from a digital identity document (user's identity card, biometric passport) in the user's possession is obtained independently and in a complementary manner. In one basic embodiment, this piece of data is transmitted by a digital identity document that consists of a digital signature of certain of the pieces of data recorded therein. In another embodiment, the terminal implements a digital representation of a classic identity document, the representation being obtained by the communications terminal.

The advantage provided by such an implementation lies in the fact that the security of the transaction is greatly improved: a server at the end of the chain is able to verify that the data that is provided for the implementation of the transaction (including the payment data, credit card number, validity, name, etc.) are corroborated by additional data (for example in the form of an authentication certificate from the identity document), this certificate being able to be checked by the server to confirm the identity of the user. Thus, the implementation of a fraud is much more complex since it is necessary to have several different types of information to be able to forge a transaction. Thus, an attacker who only has the user's payment data is not able to forge a valid transaction. The server is in possession of particular cryptographic materials (for example from the digital identity document and/or a copy of the identity document (which the server uses to produce cryptographic data identical or complementary to those produced by communication terminal when such method is implemented).

Thus, the general principle of the present technique relies on the implementing of a communications terminal comprising means for obtaining data (such as for example a processor or a circuit comprising a microprocessor) coming from an identity document of the holder of the payment means (digital identity card for example), whose data are used to make the payment transaction. More specifically, in at least one embodiment, a means for obtaining data coming from a digital identity document takes the form of a contactless communications module, such a module being more specifically a near-field communications (NFC) module. This module receives an instruction or a command from a processor of the communications terminal seeking to obtain contactless data. It may be a command of a general character. Besides, this module is connected to a contactless antenna. This contactless antenna is used to send out a signal addressed to the identity document (the digital identity card and/or the digital/biometric passport) and to receive a signal coming from this identity document. To this end, an aspect of the disclosure implements for example an application installed within the communications terminal, the application comprising means to detect data entry fields of payment means. In another embodiment, it is possible to use a classic identity document. This embodiment is explained here below.

Thus, a digital identity document takes for example the form of a card or a document comprising an NFC (near-field communications) type of antenna, this antenna comprising means for transmitting data to a receiver when it receives, from this receiver, a request to this effect (the request taking for example the form of an electromagnetic signal). The antenna, called a contactless antenna, can be connected to a processor. This processor can for example be the chip of the smartcard or an additional processor embedded in the substrate of the card (like the antenna). Secondarily, a digital identity document can also take the form of a communications terminal (a second communications terminal) that is provided with contactless data transmission means and, as the case may be, an application specifically intended to transmit data equivalent or identical to digital identity document data. Such an application can for example be a security application that is installed within the communications terminal and preserves this data in a secure manner. In this case, for example, the technique is implemented by placing this second communications terminal on the first communications terminal. It is quite possible to envisage such an implementation since many individuals have both a tablet and a smartphone, the smartphone having a "security" application, for example installed within a secure environment while the tablet is used more generally and more freely by several people in the home and is not meant to contain confidential data.

A case of general use is the following:
  using a "merchant" application installed in the communications terminal (a merchant-specific application or a generic "browser" type application), the user wishes to purchase a product or service;
  when he confirms his order, the user must provide data enabling the payment (name, number, date, CVV): this data is for example entered by the user himself (in entry fields provided for this purpose) or again it is entered "automatically" by a payment application (for example Google Pay™, Samsung Pay™, Apple Pay™, these applications host the data given by the user in a secure manner) or again a bank application;
  an applications-specific module integrated into or separate from the payment application used, if any, detects the need for payment and requests the user to place his digital identity document in proximity to the corresponding contactless interface of the communications terminal (generally situated on the back of the communications terminal);
  the securing method of the present technique is then implemented, using a mechanism implemented between the identity document (DocId) and the communications terminal (ComT), and the transactional server (SrvT): a first step of this method leads to obtaining a particular piece of data from the identity document, this data being called a user identification certificate; the user identification certificate, obtained from the user's identity document, is used in a second step of the method to certify that the transaction is being carried out by the user with the identity document "in hand" and not only with the data of the user's payment means (for example the data recorded on the digital identity card). This securing step described with reference to FIG. 1 comprises:
  a step (10) for obtaining a user identification certificate (CIUt), said user identification certificate (CIUt) being formed out of an identity document in the user's possession;
  a step of insertion (30) of said user identification certificate (CIUt) into a transaction data structure (SDTr);
  a step of transmission (40) of the transaction data structure (SDTr) to said server;
  and when the user identification certificate received by said server is valid, a step of reception (50) of a piece of data representing the conformation (ValT) of the transaction by said server.

Figure 1:
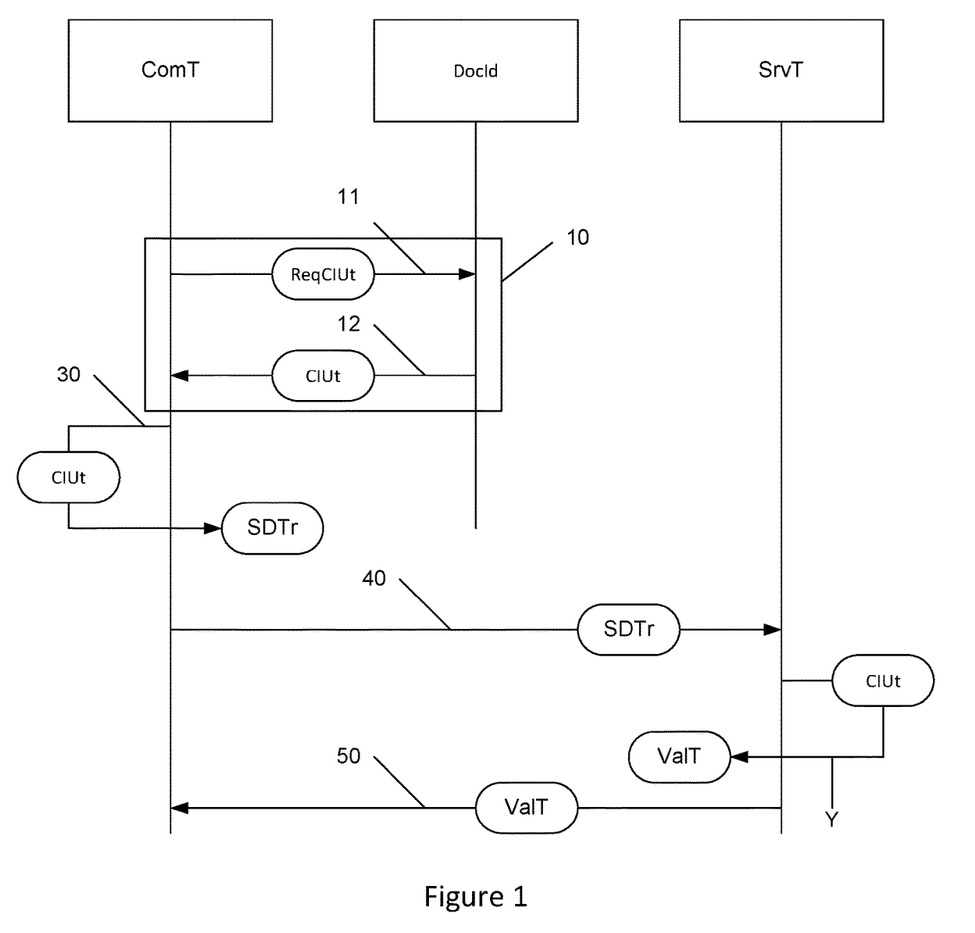
FIG. 1 describes an embodiment of the method for carrying out a transaction.

When the identity document is a digital identity document, the step for obtaining the user identification certificate comprises:
  a step (11) for sending a request, for obtaining a user identification certificate (ReqCIUt) to said digital identity card, the data of which are used for the transaction;
  a step of reception (12), from said digital identity card, of said user identification certificate (CIUt).

The data used for the transaction therefore comprise, in addition to the usual data (name, number, date of validity), a piece of complementary data (user identification certificate) directly derived from the identity document itself. These data are transmitted by means of the usual interfaces to the server (SrvT) in charge of processing the transaction. The processing of the transaction comprises a complementary phase which consists in verifying that the user identification certificate received is compliant with the expected user identification certificate. Thus, this verification is carried out by a server that possesses the cryptographic data necessary for the verification of the user identification certificate. This is therefore, as a rule, a transactional server possessing data used by the identity document (therefore for example the user's bank server which comes into possession of this data at the time when the user is registered, i.e. when the user becomes the bank's customer). However, the payment service provider (the bank) can delegate these confirmation operations for confirming transactions to trusted third-parties and can thus authorize another server (another entity) to carry out these operations in its place.

Figure 2:
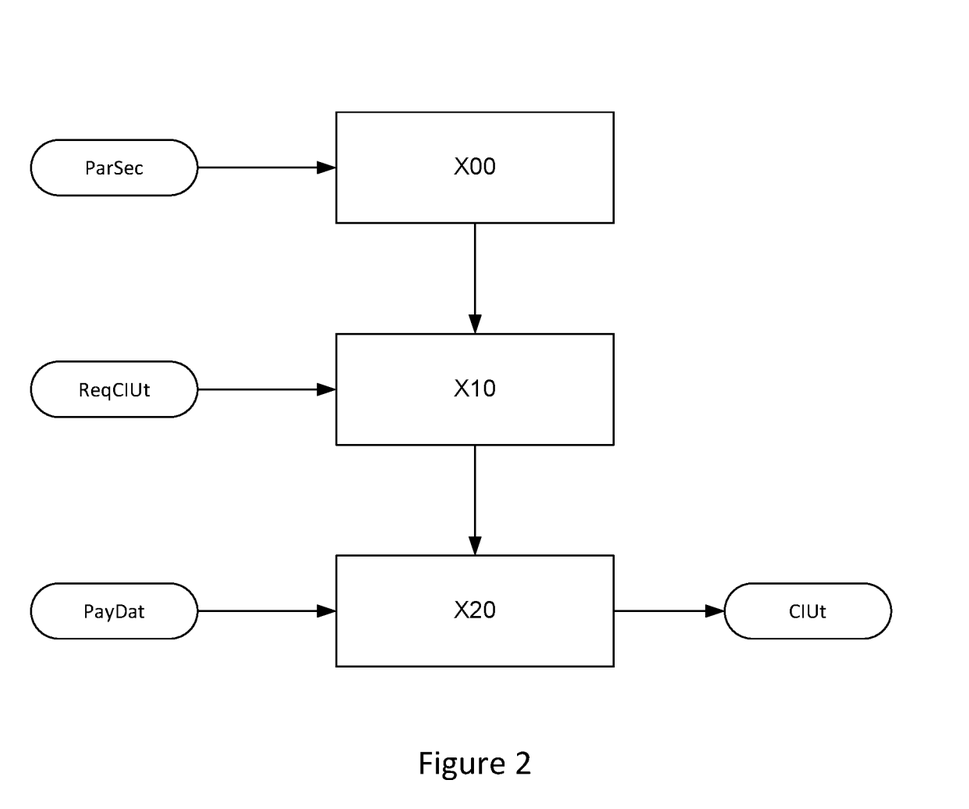
FIG. 2 describes an embodiment derived from the method for carrying out a transaction.

One particular embodiment of the creation of the user identification certificate is implemented by the digital identity document itself as explained with reference to FIG. 2. From the communications terminal, the digital identity document receives a request for setting up an authentication code. The transmission of this request follows a first exchange (X00) (handshake) between the communications terminal and the digital identity document, a handshake during which the transaction-securing parameters (ParSec) can be exchanged. On receiving the request for setting up this user identification certificate, the digital identity document uses one or more pieces of digital identity document data (IdDat) to generate (X20) a user identification certificate which itself is secured by the use of a secret held at least (or even at most) by the digital identity document itself. The user identification certificate is then transmitted to the communications terminal so that it can add it to the data transmitted to the server (by means of a communications network) to which the communications terminal is connected.

The user identification certificate can be generated in several different ways. For example, the digital identity document can generate a digital signature of the payment data (name, number, date, CVV) and transmit this signature to the communications terminal. The data are signed for example by means of a private key of the card. The data (name N1, number N2, date D, cryptogram C) are for example concatenated (N1|N2|D|C) to form a string of characters CC to which a cryptographic operation is applied in using the private key (KPriv) of the digital identity document. This private key (KPriv) is then kept only by the digital identity document (the public key has been transmitted to the transactional server by another means, as explained here above).

In another embodiment, the user identification certificate is not the only piece of data used to confirm the transaction. In this embodiment, the piece of data validating or not validating the transaction is an encoded identifier of the user's communications terminal, an identifier that is "encoded" by the digital identity document to produce a user identification certificate of the communications terminal. The user identification certificate of the communications terminal (from which the transaction is made) is thus obtained from an operation carried out by the digital identity document. The user identification certificate of the communications terminal becomes the information used to issue permission for the transaction (i.e. to confirm that a transaction can be carried out). This embodiment has several advantages. First of all, this embodiment makes it possible to overcome problems related to the retrieval of the transaction amount (an amount that is not necessarily available in the terminal itself). Secondly, such an implementation enables the (bank) server, upon reception of the user authentication certificate from the communications terminal, to decipher it with the public key of the digital identity document, and to verify that the identifier of the communications terminal corresponds to an identifier "authorized" by the (bank or transactional) server, thus enabling the addition of an additional level of security. In general, the communications terminal can parametrize the user identification certificate (and therefore use a certification parameter that it transmits to the identity document) in order to make it unique (i.e. not usable a second time). More particularly, among the certification parameters used to confer uniqueness or single-time use to the user identification certificate, we can cite the following:

- a parameter of a function for creating said user identification certificate: this parameter makes it possible to determine the order of concatenation of the identity data or again this parameter can provide a function of association of the identity data;
- a value representing an identifier of a merchant: this value can be provided by the merchant or by the editor of the application on which the payment is initiated;
- a value representing an identifier of the communications terminal: as explained here above, this value can for example represent a SIM card or USIM card identifier;
- a value representing the transaction, such as for example the amount of this transaction,
- a value representing a date and/or a time of the transaction,
- a random value, enabling the creation of the user identification certificate as a function of a parameter given by the communications terminal itself or by the transaction server; in this case, the random number is transmitted by the transaction server to the communications terminal in order to enable the subsequent comparison of the user identification certificate and prevent replay of the transaction by using same data a second time;
- a combination of above-mentioned parameters as a function of the embodiments.

This parameter or these parameters can be generated with an additional exchange with a transactional server so that it can have available the parameter or parameters used to generate the user identification certificate and subsequently verify it. Advantageously again, the parameter or parameters are entirely or partly derived from a preliminary exchange (handshake) that takes place between the communications terminal and the transactional server. This handshake determines modes of exchange between the communications terminal and the server. It delivers data which are secured (such as session keys). From these session keys, certain of the previous parameters can be derived (random value, function of creating the user identification certificate, etc.). The advantage is that it ensures that it is not possible to carry out any replay of the user identification certificate for another transaction.

The user identification certificate, created by the digital identity document used to carry out the transaction (digital identity card, second communications terminal) is inserted by the communications terminal into a transaction data structure. The insertion is preceded by a step of selection, from among a plurality of available fields, of an existing specific field. It is thus possible to envisage making this selection a random selection, as much as is needed. According to another characteristic, the specific field within which the user identification certificate is inserted is the field dedicated to the reception of the visual verification code (CVV). Thus, instead of requesting the entry of this code by the user (an entry that can create problems, especially for certain sites that are not very vigilant in terms of data security), this field is used for the insertion therein of the user identification certificate. In other embodiments, the user identification certificate is transmitted at the same time as the "token" representing the identification of the bank data of the user who is making the payment. As a reminder, "tokenization" consists in replacing a piece of data by another piece of data without any relationship between the two. The "token" is used in place of the sensitive data (for example the PAN number of the bank card), and it is therefore this token that is exposed to threat and not the sensitive data (hence not the PAN). At the same time, a base is set up to store the correspondence between the data and their corresponding tokens, a base that is called a "tokenization base". In the case of the use of a token, it is recorded within the communications terminal, for example by means of the mechanisms described in the following embodiment.

Here below, we present an implementation of the principle explained here above. This implementation is in no way exhaustive and every other implementation comprising the same characteristics as those explained can be envisaged. It is clear that all the characteristics and embodiments described in the present disclosure can be combined without its being necessary to describe all possible combinations.

When the identity document is a classic identity document (i.e. a "simple" identity card or digital identity document used solely in normal mode), the step for obtaining the user identification certificate comprises the use of a photographic sensor of the communications terminal and the use of the processor and its memory to form a user identification certificate from the digital representation of the identity document, obtained via the photographic sensor. More particularly, instead of the dialog set up between the communications terminal and the digital identity document, the communications terminal is made to carry out operations on a photograph or a video of the identity document. Thus, the step for obtaining the user identification certificate comprises:

- a step for obtaining a digital representation of the identity document, the digital representation being an image or a video of the identity document;
- optionally, a step of formatting the digital representation according to at least one predetermined formatting parameter: this formatting step can correspond to a cropping or reframing of the photograph and/or the video to ensure that this formatted representation complies with a given frame; the modifications can also include rotations, homothetic representations, translations or any other geometrical transformation of alignment of the digital representation on a given frame; the modifications can also include any operation for modification of colorimetry and/or contrast; the formatted digital representation can then be used for the extraction therefrom of one or more relevant pieces of information, used to build the user identification certificate.

Thus, the method furthermore comprise:
- a step for the extraction, from said formatted digital representation, of at least one predetermined piece of data: this extraction can implement character-recognition mechanisms or pattern-recognition mechanisms on the formatted representation;
- a step of computation, from the predetermined piece or pieces of data, of the user identification certificate: this computation can for example include a cryptographic computation that is implemented on the basis of the trusted environment of the communications terminal and makes it possible to obtain a digital signature of the predetermined data.

Thus, for example, a photograph is taken of the user's identity card (or passport). To make it easier to take the photo of this identity card, a frame is plotted on the screen of the communications terminal and the user must place his identity card so that it is positioned in the frame. When this is the case, the shot is taken, and a digital representation of the identity card is loaded into memory. Optionally, the digital representation is formatted so that it is very close to an "expected" representation in terms of subsequent processing (size and position of the logos, characters, etc.). The (possibly formatted) representation is processed to extract a piece of relevant information therefrom (card or passport number, name, user's first name, date of birth). The relevant information elements are extracted for example by means of character-recognition modules and/or identity document templates providing prior knowledge of the location of the relevant data and therefore used to extract these data. Once the relevant data are obtained, a processing is carried out on them in order to enable the obtaining of a user identification certificate: the processing, which is cryptographic in nature, can consist of a concentration of this data and the application of a signature by means of an encryption key known to the communications terminal (and the transactional server).

According to one variant, the pieces of data are not extracted. The formatted representation of the identity document is used instead of this data to produce a signature. This means that the formatted representation and the signature of this representation constitute the user identification certificate which takes position as complementary data in the transaction in CNP mode, as in previous embodiments (token, CVV, etc.).

According to another embodiment, the user identification certificate is already at the disposal of the server of the merchant. More particularly, as explained here above, in the context of a mobile payment, the transaction payment implements a communication with a merchant site (electronic commerce or e-commerce platform) to which the user has linked up in order to make one or more purchases. In this embodiment, it is assumed that the e-commerce platform has previously created, in relation with the user, a user identification certificate. When the user is connected to the e-commerce platform, before making payment, the e-commerce platform is capable of associating this user with a user identification certificate. At the time of making the transaction, as explained here above, the obtaining of the user identification certificate (CIUt) consists of a transmission of this certificate by the e-commerce platform. This transmission can be made in two different ways at least:
  (i) by transmitting the user identification certificate directly to the transaction server without passing through the user's communications terminal;
  (ii) by transmitting the user identification certificate to the user's communications terminal.

In the second example (ii), the processing done is identically to the one previously described (insertion into a data structure, transmission to the server, verification by the server).

In the first example (i), the processing of the transaction in the communications terminal does not require the insertion of the user identification certificate. However, the transaction server uses the user identification certificate which it receives from the e-commerce platform to confirm or reject the transaction, according to mechanisms identical to those described in the present application (certificate data comparison/encryption/decryption using public keys/private keys, etc.). Thus, as above, the transaction server has complementary means available enabling the transaction to be confirmed or not confirmed.

5.2. Description of One Embodiment

This embodiment uses a user identification certificate obtained during the payment through the communications terminal from which the transaction is made, this user identification certificate being produced by the user's digital identity card. To produce this user identification certificate, the user is requested to place his digital identity card on (bring it near to) the back of his communications terminal.

The communications terminal for its part comprises a secure element (SE) and/or a trusted execution environment (TEE) that comprises a specific application (of the contactless registry event listener (CREL) type or its equivalent depending on the environment). Thus, in this embodiment, the communications terminal is deemed to host, at least through the secure element (SE) (or a TEE and/or USIM, SIM, UICC) at least one "low-level" application in charge of the management of the payment data (activation/deactivation of the payment cards). The secure element has a communications interface with a contactless communications controller that is wired with the contactless antenna of the communications terminal. In this embodiment, an interrogation application (APPINT) is implemented within the secure element. This interrogation application is called by the payment application of the open-source operating system (Android™, iOS™, etc.). Through the low-level application, the payment application manages the processing of the data needed to implement a payment (for example insertion of data related to "name", "number", "date", "CVV" in the fields provided for this purpose). At the same time, or in succession, the payment application makes a request to the interrogation application for obtaining a user identification certificate. To request this code, the interrogation application can have predefined parameters or can be provided with parameters by the payment application.

After notification of the payment application, the digital identity card is placed in proximity to the antenna, without contact by the user. The interrogation application asks to obtain the user identification certificate in transmitting an appropriate command to the digital identity card which carries out the requested operation depending on the parameters that are transferred into the request for obtaining the user identification certificate. In this embodiment, two parameters are used: a value representing the identification of the terminal and a value representing the time of the transaction. These representative values are for example concatenated and transmitted to the digital identity card in the request for obtaining the user identification certificate. The representative values can for example be a hash of the original value or a contraction of this value or again an extraction of a part of this value. It can be an original value as such. This is determined according to the size of the data available to set the parameters in the request for obtaining the user identification certificate.

The digital identity card then computes the user identification certificate as a function of the parameter or parameters transmitted and renders this user identification certificate to the communications terminal. More particularly, the contactless communications terminal receives and sends, for example, through an HCI (host controller interface), the user identification certificate to the interrogation application which, depending on operational implementation, itself transmits this user identification certificate to the payment application (or else to the merchant's application). The user identification certificate is then inserted into the transaction data structure which is transmitted on the communications network up to the server or else again inserted into an "http" type response (for example by means of secure AJAX services) to the (online) server of the merchant or of the bank server (of the merchant).

As already indicated here above, the terminal from which the transaction is made is not a payment terminal (in the sense of a terminal into which the bank card is inserted and into which a PIN code is entered). It is a terminal such as a tablet or a smartphone and not a payment terminal such as those installed with merchants.

Thus, in this embodiment, the method implemented comprises, at the communications terminal:
- a step for sending, to said digital identity card whose data are used for the transaction, a request for obtaining a user identification certificate;
- a step for receiving, from said digital identity card, said user identification certificate;
- a step of insertion of said user identification certificate into a transaction data structure;
- a step of transmission of the transaction data structure to said server; and
- when the user identification certificate received by said server is valid, a step of reception of a piece of data representing the validation of the transaction by said server.

When the user identification certificate corresponds to at least one expected user identification certificate, a step of delivery of a piece of data representing a confirmation of transaction to an entity.

The piece of data representing a confirmation of transaction can then be provided to confirm the bank transaction (this confirmation of bank transaction is made on the basis of other parameters and values coming into the confirmation process, naturally) to another entity (such as for example a bank card, when the transaction in itself is processed by a transaction server).

Thus, the method makes it possible to compare the user identification certificate produced by the identity document (the digital identity card) with an expected user identification certificate. The format of the expected user identification certificate can be defined by the user's bank automatically or statically. For a static definition, the types and the nature of the parameters are determined in advance during the encoding of the low-level interrogation application (for example). For a dynamic definition, theses parameters are the object of exchanges between the user's communications terminal and the appropriate server (transactional server or bank server).

5.3. Transactional Server

Figure 3:
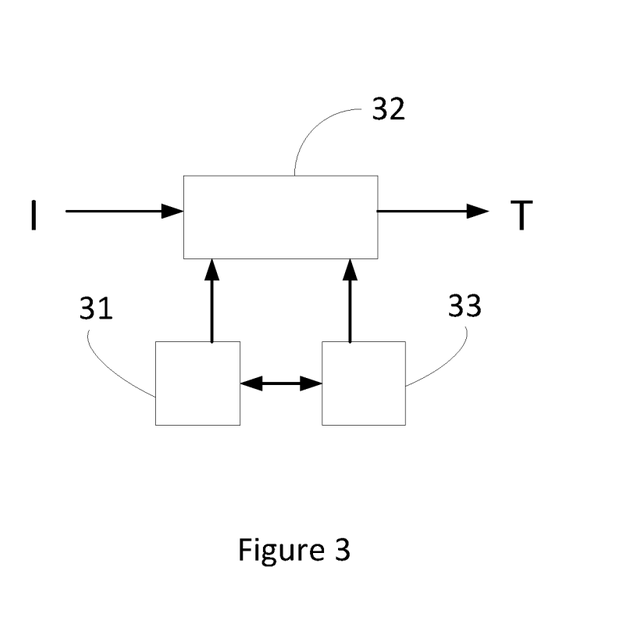
FIG. 3 illustrates an architecture of a server capable of implementing a method for carrying out a transaction.

In at least one embodiment, the method described is implemented by means of a transactional server presented with reference to FIG. 3. Such a server can, by choice, be implemented by a banking institution, a payment service provider or a service provider acting as an intermediary between one or more banking establishments or payment establishments.

Such a transaction server comprises a memory 31, a processing unit 32 equipped for example with a microprocessor and controlled by the computer program 33, implementing the method according to an aspect of the disclosure. In at least one embodiment, an aspect of the disclosure is implemented in the form of a bank server of a payment system. Such a server comprises:
- means for receiving a transaction request coming at least partially from the communications terminal comprising at least one payment data identifier (token) and/or the bank data itself, all accompanied by a user identification certificate; these means can take the form of a connection interface (I) with one or more communications networks. They can be software interfaces or hardware interfaces (of the network adaptor card type or network communications hardware module type).
- means for obtaining a piece of data for verifying the user identification certificate with the identity document used for the transaction; these means can take the form of a connection interface (I) with one or more communications networks. They can be software interfaces or hardware interfaces (of the network adaptor card type or they can be network communications hardware modules); they can also take the form of a tokenization database when this technique is used to make payments.
- means for determining a current user identification certificate associated with the data received within the transaction request: they are for example means for computing a current user identification certificate from data received: in the event of the reception of a token, bank data associated with this token are retrieved and from these data and from known parameters of computation of the user identification certificate;
- means for comparing identification certificates with each other as a function of the user's known bank data;
- means for providing an entity (a bank server for example) with an authorization of transaction when said comparison is positive. These means can take the form of a connection interface for connection with one or more communications networks. They can be software or hardware interfaces (of the network card or network communications hardware module type).

In at least one embodiment, such a server also comprises means for obtaining at least one piece of information coming from a communications terminal which is supposed to be in the possession of the user for whom it is sought to confirm a transaction. In this embodiment, this server can for example transmit a request for obtaining this piece of information to the communications terminal. To this end, it can implement several techniques, the first being the transmission of an SMS type message to an application installed in the terminal (cf. Communications Application and Terminal), in order to confirm the transaction relative to a known and authorized communications terminal identifier.

When possible, the user identification certificate is derived from a computation made with the private key of the identity document (for example a private key of the contactless card) and the data of this encrypted user identification certificate are decrypted by means of a public key of the card which is in possession of the bank server and/or the transaction server that implements the present technique. Hence, when the server decrypts the user identification certificate received from the mobile terminal, it is verified that the data obtained by this encryption truly correspond to the expected data.

5.4. Device for Implementing an Aspect of the Disclosure

Figure 4:
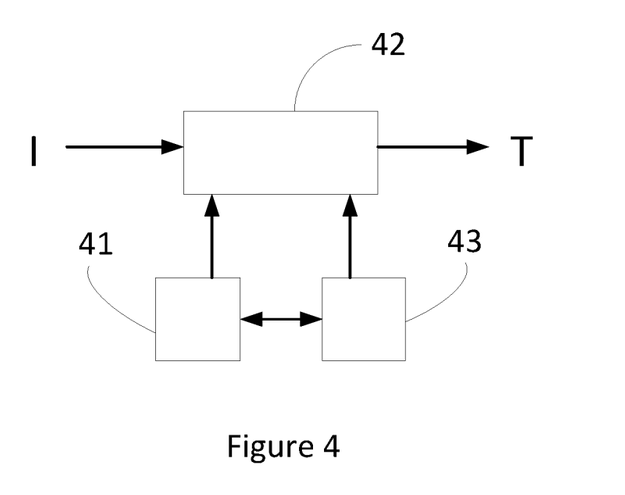
FIG. 4 illustrates an architecture of a customer capable of implementing a method for carrying out a transaction.

Referring to FIG. 4, we present a simplified architecture of a mobile device capable of transmitting its position. Such a mobile device comprises a memory 41, a processing unit 42 equipped for example with a microprocessor and controlled by the computer program 43, implementing the method according to an aspect of the disclosure. In at least one embodiment, an aspect of the disclosure is implemented in the form of a mobile application installed on the mobile device in the user's possession. Such a mobile device comprises:
- (i) means for sending, to said digital identity card whose data are used for the transaction, a request for obtaining a user identification certificate;
- (ii) means for receiving, from said digital identity card, said user identification certificate;
- (iii) means for inserting said user identification certificate into a transaction data structure;
- (iv) means for transmitting the transaction data structure to said server; and
- (v) means for receiving a piece of data representing the validation of the transaction by said server.

These means take the form of a specific software application, or again the form of dedicated hardware components, such as a secure element (SE) or a trusted execution environment. The secure element can take the form of a SIM, USIM, UICC card or again a specific security component, transplanted onto the motherboard of the communications terminal. More particularly, in at least one embodiment, these means take the form of several hardware components to which several software components are adjoined. More particularly, the means for sending the request for obtaining the user identification certificate are included in a secure component which comprises a more direct or less direct access a to an NFC-type near electromagnetic field transmission/reception controller, enabling direct interrogation of an NFC-compatible identity document. This secure component is in charge of at least partially determining a parameter for computing the user identification certificate. Other components of the communications terminal are the object of a description related to the proposed embodiment.

Although the present disclosure has been described with reference to one or more examples, workers skilled in the art will recognize that changes may be made in form and detail without departing from the scope of the disclosure and/or the appended claims.

The invention claimed is:

1. A method implemented between a communications terminal of a user, a digital identity card and a server for processing a transaction of the communications terminal, the transaction being a payment transaction involving use of payment data provided by the communications terminal of the user during execution of the transaction, wherein the method comprises the following acts:

sending, through a near-field communication (NFC) link by a processor of the communications terminal, a request for a user identification certificate to the digital identity card in the possession of the user, the request including the payment data, the payment data comprising a name, a number, and a card verification value (CVV);

generating, by the digital identity card, the requested user identification certificate, the generating by the digital identity card comprising, generating, using a private key, a digital signature of said name, said number, and said CVV obtained from the digital identity card, the private key being kept only by the digital identity card;

receiving, by the processor of the communications terminal from the digital identity card through the NFC link, the generated user identification certificate;

inserting, by the processor of the communications terminal, said generated user identification certificate into a transaction data structure, transmitting, by the processor of the communications terminal, the inserted transaction data structure to said server;

decrypting, by the server, the digital signature of said name, said number, and said CVV of the received inserted transaction data structure using a public key of the digital identity card previously transmitted to the server;

comparing, by the server, said decrypted name, said decrypted number, and said decrypted CVV of the inserted transaction data structure with an expected transaction certificate in possession of said server;

determining, by the server, that said decrypted name, said decrypted number, and said decrypted CVV match the expected transaction certificate;

receiving, by the processor of the communications terminal, a piece of data representing validation of the transaction by said server, the validation of the transaction representing said determined match; and in response to receiving said piece of data, requesting, by the processor of the communications terminal, the server to implement the transaction through a communications network.

2. The method according to claim 1, wherein the method furthermore comprises:

a preliminary act of determining a certification parameter value, said certification parameter being related to said transaction; and inserting the certification parameter value into the request for obtaining a user identification certificate.

3. The method according to claim 2, wherein the certification parameter belongs to the group consisting of:

a creation function parameter for creating said user identification certificate;

a value representing a merchant's identifier;

a value representing a communications terminal identifier;

a value representing the transaction;

a value representing a date and/or a time of the transaction.

4. The method according to claim 1, wherein the inserting said user identification certificate into a transaction data structure comprises selection, from among a plurality of available fields, of a specific existing field.

5. The method according to claim 4, wherein the specific field is a field dedicated to reception of a card verification value.

6. The method according to claim 2, wherein the certification parameter comprises a piece of data representing an identifier of said communications terminal and a piece of data representing a time of the transaction.

* * * * *